United States Patent
Corwin et al.

(10) Patent No.: US 6,378,063 B2
(45) Date of Patent: Apr. 23, 2002

(54) METHOD AND APPARATUS FOR EFFICIENTLY ROUTING DEPENDENT INSTRUCTIONS TO CLUSTERED EXECUTION UNITS

(75) Inventors: Michael P. Corwin, Sunnyvale; Harshvardhan Sharangpani, Santa Clara; Hans Mulder, San Francisco; Ken Arora, Cupertino, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/220,154

(22) Filed: Dec. 23, 1998

(51) Int. Cl.$^7$ .................................. G06F 9/38
(52) U.S. Cl. ....................... 712/217; 712/206
(58) Field of Search ................ 712/217, 216, 712/206

(56) References Cited

U.S. PATENT DOCUMENTS 5,202,975 A * 4/1993 Rasbold et al. ............ 709/305
5,699,537 A * 12/1997 Sharangpani et al. ....... 712/217
5,884,061 A * 3/1999 Hesson et al. .............. 712/217

FOREIGN PATENT DOCUMENTS

| EP | 0767425 | 4/1997 |
| GB | 2322718 | 9/1998 |
| WO | 95/09394 | 4/1995 |

OTHER PUBLICATIONS

Palacharla, S., et al., "Complexity–Effective Superscalar Processors", *Ann. Int'l Symp. on Computer Architecture, vol. CONF 24*, New York, pp. 206–218, (1997).

* cited by examiner

*Primary Examiner*—Richard L Ellis
*Assistant Examiner*—Gautam R Patel
(74) *Attorney, Agent, or Firm*—Schwegman, Lundberg, Woessner & Kluth, P.A.

(57) ABSTRACT

A dispersal unit in combination with a chain affinity unit and an intra-cycle dependency analyzer routes instructions in a microprocessor in order to improve microprocessor performance. The dispersal unit routes instructions to a particular cluster in the microprocessor in response to information stored in the chain affinity unit. The intra-cycle dependency analyzer identifies dependencies in groups of instructions to the dispersal unit, and the dispersal unit routes instructions in the group based on those dependencies.

11 Claims, 2 Drawing Sheets

METHOD AND APPARATUS FOR EFFICIENTLY ROUTING DEPENDENT INSTRUCTIONS TO CLUSTERED EXECUTION UNITS

TECHNICAL FIELD OF THE INVENTION

This invention relates to the field of microprocessor architecture, more particularly to an architecture that makes efficient use of instruction execution units in a multi-cluster system.

BACKGROUND OF THE INVENTION

Early microprocessors operated at relatively low clock frequencies. As users demanded faster microprocessors, designers responded by increasing the clock frequency. In some designs, the higher clock frequency did not interfere with the correct logical operation of the microprocessor. In other designs, the higher clock frequency caused subsystems in the microprocessor to fail. These failures were addressed in several ways. Some failures were corrected by packing the logic devices more densely on the chip in order to decrease signal path lengths between the logic devices. Others were corrected by implementing the design in a faster technology, such as gallium arsenide. As clock frequencies continued to increase, these strategies became more difficult and costly to implement, and other strategies evolved to satisfy the user's demand for faster microprocessors.

One such strategy involved designing multiple instruction execution units into a single microprocessor. A microprocessor having multiple instruction execution units can execute more instructions per unit of time than a microprocessor having a single instruction execution unit. This strategy evolved to a point where multiple instruction execution units were grouped or clustered to further increase microprocessor performance. However, the performance improvement in these multi-cluster microprocessors comes at the cost of increased complexity in the scheduler, the microprocessor subsystem that routes instructions to the clusters in an attempt to improve the utilization of the instruction execution units. An additional problem arises when the results produced by a first cluster are required for use by a second cluster. In that case, a delay in waiting for the results produced by the first cluster to be available to the second cluster reduces the throughput of the microprocessor.

Referring to FIG. 1, a block diagram of a prior art microprocessor system is shown. Memory 100 is provided for storing instructions. Coupled to memory 100 is instruction fetch 105. The purpose of instruction fetch 105 is to retrieve instructions from memory 100 and present them to scheduler 110. Scheduler 110 routes instructions to either first cluster 115 or second cluster 120. First execution unit 125 and second execution unit 130 are provided for executing instructions routed to first cluster 115. Third execution unit 135 and fourth execution unit 140 are provided for executing instructions routed to second cluster 120. Retirement unit 145 is coupled to the outputs of first cluster 115 and second cluster 120 and couples the architectural state via write back bus 160 to first cluster 115 and second cluster 120. The architectural state is the bit configuration of all the registers in retirement unit 145 at a given time. First cluster fast results bypass 150 is provided to couple the output of first cluster 115 to the input of first cluster 115, for use in first cluster 115, prior to commitment in retirement unit 145. Likewise, second cluster fast results bypass 155 is provided to couple the output of second cluster 120 to the input of second cluster 120, for use in second cluster 120, prior to commitment in retirement unit 145.

In operation, instruction fetch 105 retrieves instructions from memory 100 and delivers the instructions to scheduler 110. Scheduler 110 attempts to route instructions to first cluster 115 and second cluster 120 in a way that provides high utilization of execution units 125, 130, 135, and 140. Unfortunately, when a read instruction is executed in second cluster 120 after a write instruction was executed in first cluster 115, the results of the write instruction are not immediately available to the read instruction, since the results of the write instruction must be fed back to second cluster 120 from the architectural state in retirement unit 145 via write back bus 160.

For these and other reasons there is a need for the present invention.

SUMMARY OF THE INVENTION

In one embodiment an apparatus for routing computer instructions comprises a plurality of queues to buffer instructions to a plurality of clusters, a chain affinity unit to store information, and a dispersal unit to route instructions to the plurality of queues based on information to be stored in the chain affinity unit.

DETAILED DESCRIPTION OF THE INVENTION

Figure 1:
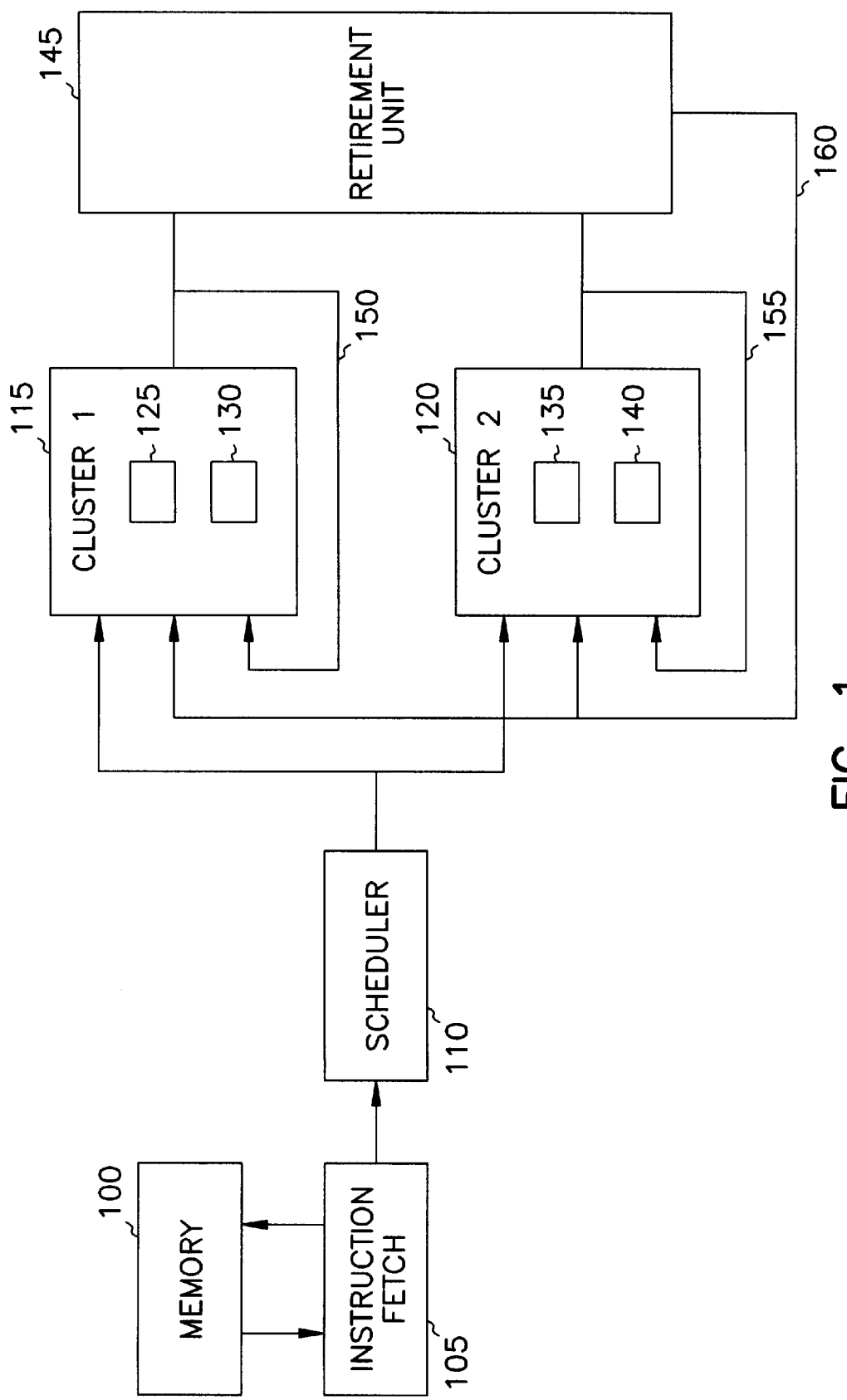
FIG. 1 is a block diagram of a prior art general purpose microprocessor system.
Figure 2:
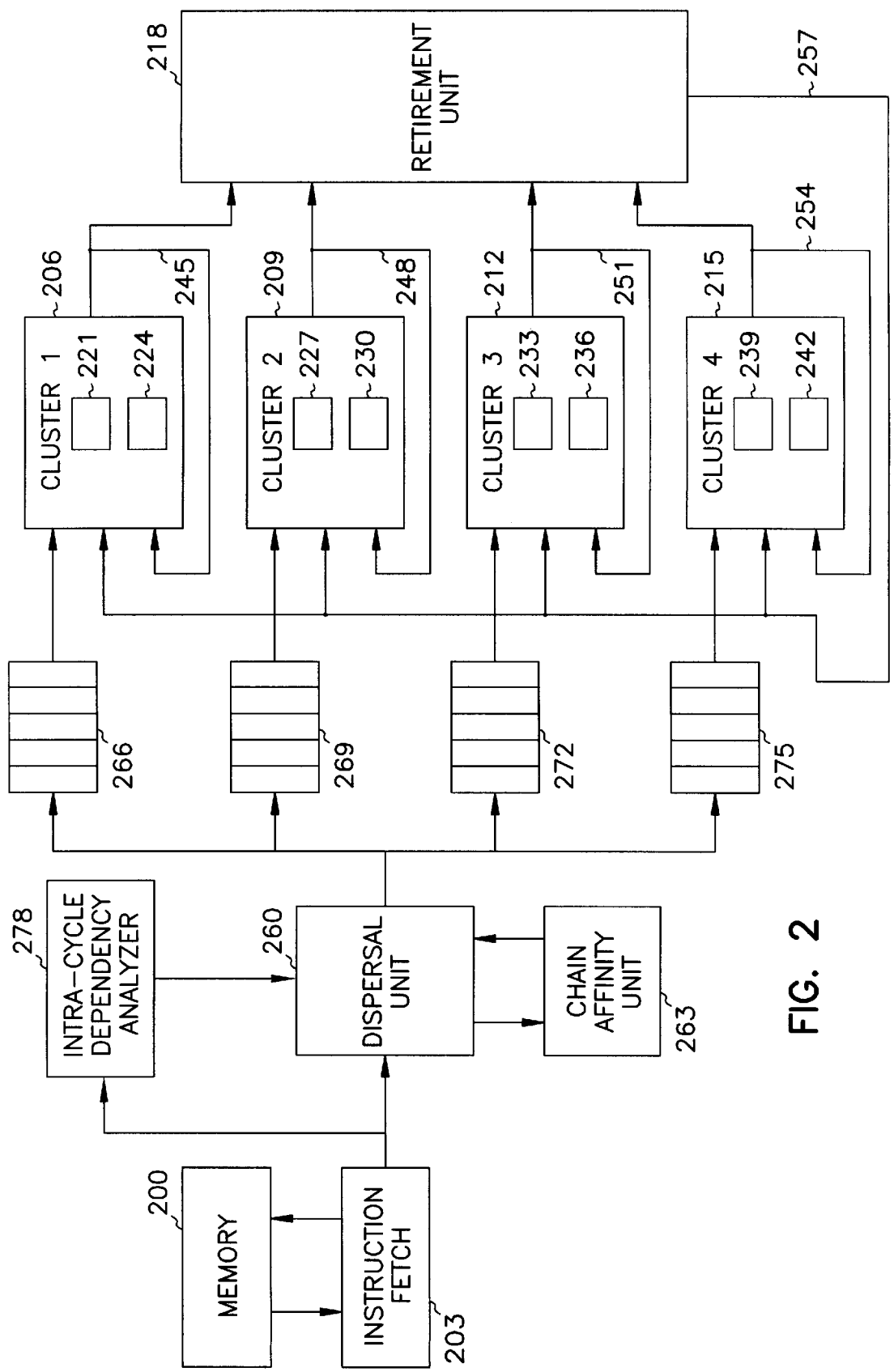
FIG. 2 is a block diagram of one embodiment of a microprocessor system of the present invention.

Referring to FIG. 2, a block diagram of one embodiment of a microprocessor system of the present invention is shown. Memory 200 stores instructions, and instruction fetch 203 retrieves instructions from memory 200. Intracycle dependency analyzer 278 analyzes groups of instructions received from instruction fetch 203 and identifies dependent instructions in the analyzed group to dispersal unit 260. Dispersal unit 260 receives instructions from instruction fetch 203, manages chain affinity unit 263, and routes instructions received from instruction fetch 203 to a plurality of queues 266, 269, 272, and 275. The plurality of queues is coupled to a plurality of clusters 206, 209, 212, and 215, which include eight execution units 221, 224, 227, 230, 233, 236, 239, and 242, and four fast results bypasses 245, 248, 251, and 254. The output of the clusters are coupled to retirement unit 218, which feeds back the architectural state via write back bus 257 to the clusters. Those skilled in the art will recognize that this embodiment of the present invention is not limited in the number of clusters, the number of execution units per cluster, or in the number of queues.

Dispersal unit 260, in one embodiment of the present invention, is a hardware unit that routes instructions to queues 266, 269, 272, and 275. In one embodiment, when a read instruction is encountered in the instruction stream, dispersal unit 260 examines the information in chain affinity unit 263 to determine whether a cluster has recently written to a register. If a cluster has recently written to a register that is to be read by the read instruction encountered in the instruction stream, then dispersal unit 260 routes the current read instruction to the queue that feeds the cluster. In that way, the current read instruction need not wait for retirement of the results of the previous write instruction before executing. This improves processor utilization. In another embodiment, dispersal unit 260, in addition to routing instructions, load balances across the queues by maintaining a previous history of chains. In still another embodiment, dispersal unit 260, in addition to routing instructions, load balances across the queues by maintaining approximately equal queue lengths. In yet another embodiment, dispersal unit 260, in addition to routing instructions, load balances across the queues by maintaining a list of hints from the compiler.

Chain affinity unit 263 stores information. In one embodiment, the information to be stored in chain affinity unit 263 associates a cluster in the plurality of clusters with a register. The cluster associated with the register is the last cluster to write to the register. Any storage region is suitable for use as chain affinity unit 263. In one embodiment, the storage region is a table having a number of entries. In an alternate embodiment, the table has a number of entries equal to the number of registers in the architectural state of the system. Each entry consists of two fields. The first field is a one bit field that indicates whether the register was a destination of a write operation. The second field employs a sufficient number of bits to indicate the cluster to which the last write instruction was directed. For example, in an embodiment that includes four clusters and eight execution units, the number of bits in the second field is two.

In one embodiment, information is entered into chain affinity unit 263 by dispersal unit 260 each time a write instruction occurs in the instruction stream. Information identifying the register to be written, and information identifying the cluster to execute the write instruction is entered into chain affinity unit 263. In one embodiment, the physical location of information in chain affinity unit 263 can be used to identify the type of information stored. For example, information identifying the register to be written may be identified by the location in which the cluster information is entered into chain affinity unit 263. Information entered into chain affinity unit 263 is erased or removed by dispersal unit 260 at a time after write information is committed to the architectural state in retirement unit 218.

Intra-cycle dependency analyzer 278, in one embodiment of the present invention, is a hardware unit that analyzes groups of instructions in order to identify dependent instructions. A dependent instruction is an instruction that reads a register that was previously written. In one embodiment, a group of instructions is received from instruction fetch 203 and set for execution during one clock cycle. Intra-cycle dependency analyzer 278 sorts the group of instructions received from instruction fetch 203 in order to identify instructions that may have dependencies, identifies dependent instructions in the sorted group, and communicates the identity of the dependent instructions to dispersal unit 260.

Queues, in one embodiment, buffer instructions for execution by the execution units. In one embodiment, queues 266, 269, 272, and 275 are first-in-first-out (FIFO) queues. A FIFO queue receives a series of inputs and disperses them in the order in which they were received. In an alternate embodiment, queues 266, 269, 272, and 275 are data flow schedulers. A data flow scheduler receives a series of inputs and is capable of dispersing the received inputs in an order other than the order in which they are received. Those skilled in the art will recognize that a queue suitable for use in the present invention can be realized in a variety of embodiments and is not limited to FIFO queues and data flow schedulers.

An advantage of an embodiment in which queues buffer instructions prior to their execution over a system without queues is that a less complicated instruction routing algorithm can be employed by dispersal unit 260. In a system without queues, dispersal unit 260 tracks the status of eight execution units in order to route the instructions. An algorithm employed by dispersal unit 260 to track the status of four queues can be less complicated than an algorithm employed by dispersal unit 260 to track of the status of eight execution units.

In one embodiment, queues 266, 269, 272, and 275 receive instructions from dispersal unit 260 and in turn route instructions to clusters 206, 209, 212, and 215. Dispersal unit 260, in one embodiment, manages chain affinity unit 263 by entering write information into chain affinity unit 263, and selectively erasing information from chain affinity unit 263. A time for entering write information into chain affinity unit 263 is when a write instruction is received. A time for selectively erasing information in chain affinity unit 263 is after a register, which was the destination of a write instruction, is committed to retirement unit 218.

One function of queues 266, 269, 272, and 275 is to stage a cache of instructions for execution at the input to each cluster 206, 209, 212, and 215, respectively. Staging a cache of instructions at the input to each cluster allows high utilization of the instruction execution units, since the instruction execution units will have instructions to execute, as long as the queues do not completely drain.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus for routing computer instructions comprising:

a plurality of queues;

a plurality of clusters directly connected to the plurality of queues;

a chain affinity unit to store information;

a dispersal unit to route instructions to the plurality of queues based on information to be stored in the chain affinity unit; and an intra-cycle dependency analyzer coupled to the dispersal unit, the inra-cycle dependency analyzer to identify dependencies in a group of instructions.

2. The apparatus of claim 1, wherein information to be stored in the chain affinity unit associates a cluster in the plurality of clusters with a register.

3. The apparatus of claim 2, wherein the dispersal unit is capable of routing an instruction to the cluster associated with the register.

4. The apparatus of claim 1, wherein each of the plurality of queues is a first-in-first-out (FIFO) queue.

5. The apparatus of claim 1, wherein each of the plurality of queues is data flow scheduler.

6. The apparatus of claim 1, wherein the chain affinity unit is a table.

7. The apparatus of claim 1, further comprising a retirement unit having a number of registers, and the retirement unit to receive input from the plurality of clusters.

8. The apparatus of claim 7, wherein the chain affinity unit is capable of having a number of entries equal to the number of registers in the retirement unit.

9. The apparatus of claim 8, wherein the dispersal unit routes instructions that read a register to one of the plurality of clusters that has most recently written the register.

10. The apparatus of claim 1, further comprising an intra-cycle dependency analyzer coupled to the dispersal unit, the intra-cycle dependency analyzer to identify dependencies in a group of instructions to the dispersal unit.

11. The apparatus of claim 10, wherein dependencies comprise a first instruction and a second instruction, where the second instruction is to read a register previously written by the first instruction.

* * * * *